United States Patent
Gruber

(10) Patent No.: US 7,981,332 B2
(45) Date of Patent: Jul. 19, 2011

(54) METHOD AND APPARATUS FOR MAKING A COMPOSITE, IN PARTICULAR COMPRISING AN INJECTION-MOLDED PART WITH A POLYURETHANE COATING

(75) Inventor: Marco Gruber, München (DE)

(73) Assignee: KraussMaffei Technologies GmbH, München (DE)

( * ) Notice: Subject to any disclaimer, the term of this patent is extended or adjusted under 35 U.S.C. 154(b) by 0 days.

(21) Appl. No.: 12/412,879

(22) Filed: Mar. 27, 2009

(65) Prior Publication Data

US 2009/0184436 A1 Jul. 23, 2009

Related U.S. Application Data

(63) Continuation of application No. PCT/EP2007/059737, filed on Sep. 14, 2007.

(30) Foreign Application Priority Data

Oct. 12, 2006 (DE) .......................... 10 2006 048 252

(51) Int. Cl.
B29C 45/17 (2006.01)
(52) U.S. Cl. ........................ 264/40.3; 264/102; 264/255
(58) Field of Classification Search .................. 264/255, 264/40.3, 102

See application file for complete search history.

(56) References Cited

U.S. PATENT DOCUMENTS

| | | | | |
|---|---|---|---|---|
| 4,081,578 A * | 3/1978 | van Essen et al. | .............. | 428/63 |
| 4,207,049 A | 6/1980 | Malo et al. | | |
| 5,356,576 A * | 10/1994 | Fischbach | .................... | 264/40.4 |
| 6,805,546 B2 * | 10/2004 | Hahn et al. | ................. | 425/405.1 |
| 2003/0038407 A1 * | 2/2003 | Bethune | ........................ | 264/478 |

FOREIGN PATENT DOCUMENTS

| | | |
|---|---|---|
| AT | 005 360 U1 | 6/2002 |
| DE | 24 61 925 A1 | 11/1975 |
| DE | 196 50 854 C1 | 3/1998 |
| DE | 10 2005 013 974 | 9/2006 |
| JP | 03 164218 A | 7/1991 |

OTHER PUBLICATIONS

"Hochwertige Premiumoberflächen aus Spritzgieβ- and Reaktionstechnik" [*High-Quality Premium Surfaces by Injection Molding and Reaction Technologies*], published in the trade publication "Kunststoffe" [*Plastics*], issue Oct. 2004, Munich, DE, vol. 10, XP001205066, pp. 180-182, 184, 186.

* cited by examiner

*Primary Examiner* — Joseph S Del Sole
*Assistant Examiner* — James Sanders
(74) *Attorney, Agent, or Firm* — Henry M. Feiereisen; Ursula B. Day

(57) ABSTRACT

In a method for producing a composite, a carrier component is placed into an opened cavity of a mold. The mold is then closed to a predetermined position, thereby creating a cavity of a first expanded size. To improve venting, a vacuum is generated in the expanded cavity before filling the expanded cavity with a flooding material. A compression step is then executed either at the same time as flooding material is introduced or following the introduction of the flooding material.

13 Claims, 1 Drawing Sheet

METHOD AND APPARATUS FOR MAKING A COMPOSITE, IN PARTICULAR COMPRISING AN INJECTION-MOLDED PART WITH A POLYURETHANE COATING

CROSS-REFERENCES TO RELATED APPLICATIONS

This application is a continuation of prior filed copending PCT International application no. PCT/EP2007/059737, filed Sep. 14, 2007, which designated the United States and has been published as International Publication No. WO 2008/043640 and on which priority is claimed under 35 U.S.C. §120 and which claims the priority of German Patent Application, Serial No. 10 2006 048 252.2, filed Oct. 12, 2006, pursuant to 35 U.S.C. 119(a)-(d), the contents of which are incorporated herein by reference in their entirety as if fully set forth herein.

BACKGROUND OF THE INVENTION

The present invention relates to a method and apparatus for making a composite.

The following discussion of related art is provided to assist the reader in understanding the advantages of the invention, and is not to be construed as an admission that this related art is prior art to this invention.

Production of composites typically involves the coating of a produced product with a further layer, such as a plastic layer. The so-called SKINFORM® technology, described in the publication "Hochwertige Premiumoberflächen aus Spritzgieβ- und Reaktionstechnik" [High-Quality Premium Surfaces By Injection Molding and Reaction Technologies], published in the trade publication "Kunststoffe" [Plastics], issue October 2004, involves a process by which an injection-molded part of thermoplastic material is produced in a first step (cycle 1) through an injection molding or injection compression molding process. This part is then flooded in a further process step (cycle 2) with polyurethane material of a viscosity which is smaller than the viscosity of the thermoplastic material. This flooding step takes place in an enlarged cavity in which the component produced in cycle 1 has been introduced. The flooding material is hereby injected into the space between the component in the cavity and the cavity wall.

In a multi-component injection molding process, various injection molding materials are injected into different cavities in various steps. Composites can hereby also be produced depending on the configuration and disposition of the cavities.

Another thermoplastic processing process involves compression techniques in which material melts are introduced in an initially enlarged cavity which is then reduced in size in a compression step to its final size. As the cavity is compressed, material introduced into the initially enlarged cavity is pressed apart and dispersed throughout the entire cavity.

U.S. Pat. No. 4,207,049 describes a device for coating a plastic part, whereby an injection-molded part is initially produced in a cavity. The thus-filled cavity is enlarged after the injection-molded part has cured. As the cavity is substantially sealed off in relation to the ambient environment, a vacuum is created when the mold halves are separated to create a space for flooding material. Material is filled into the created space to form the outer surface, with the vacuum assisting the flooding step. The magnitude of the pressure below atmospheric depends on the degree of separation of the mold halves and on the tightness of the flooding space in relation to the ambient environment. The pressure below atmospheric also changes during introduction of the flooding material.

It would be desirable and advantageous to address prior art shortcomings.

SUMMARY OF THE INVENTION

According to one aspect of the present invention, a method of making a composite includes the steps of producing a carrier component, transferring the carrier component into an open cavity of a mold, closing the mold to a predefined position in which the cavity has a first expanded size, applying a predefined pressure below atmospheric in the cavity of first expanded size to produce a vacuum, measuring the pressure in the cavity of first expanded size, introducing flooding material into the cavity of first expanded size, and executing a compression molding step by reducing the cavity to a second contracted size.

The present invention resolves prior art problems by applying, prior to the compression step, at least a slight predefined pressure below atmospheric in the expanded cavity in which the carrier component is placed for subsequent flooding. The pressure below atmospheric is hereby measured. The vacuum ensures a desired venting during introduction of the flooding material and eliminates any venting problem during the molding process. In addition, the application of a low pressure process can be employed for introducing the flooding material. Mold wear, in particular in the region of the mold parting plane, is thus overall reduced.

Another advantage of a method according to the present invention is the capability to coat the carrier component with a very thin layer. Unlike conventional methods, there is no need to provide vent cavities which must be removed in a subsequent finishing step. As a result, design choices are greatly expanded. Thus, there is less finishing work and less material consumption. In addition, it becomes now possible to place the PUR mixing head in midsection of the component because of the absence of venting problems. Thus, polyurethane foams can be produced with low viscosity and thin wall thickness because the flooding material is not required to dislodge trapped air in the cavity and therefore is able to expand better and easier as the inner mold pressure is smaller.

There are many ways to implement the invention.

For example, the carrier component can be produced using injection molding or injection compression molding. This can be realized in a first cycle step, called cycle 1.The carrier component can then be transferred into an enlarged cavity of a further mold. This transfer may be carried out using conventional devices like reversing plate, rotary table, or sliding table. After introduction of the carrier component in the enlarged cavity, the cavity can be closed to a predefined position, thereby establishing between the introduced carrier component and the cavity wall a space which is sealed off to a certain degree in relation to the surroundings but still enlarged compared to the cavity size of the finished product. Before introducing flooding material, e.g. polyurethane material, a pressure below atmospheric is produced in the cavity via a vacuum channel and a vacuum pump. The pressure below atmospheric may hereby be generated for a predetermined time period. As described above, the pressure below atmospheric is generated in accordance with the invention up to a certain magnitude.

After the time period and reaching the magnitude of the pressure below atmospheric, the free space in the cavity is flooded through injection of flooding material, e.g. polyurethane. Simultaneously with or at slight delay after the start of injection, the clamping unit is activated to contract the mold to its final size. Thus, during the compression step, a clamping force is applied which is held also during a possible holding pressure phase. As a result of "venting" the cavity through application of a vacuum, the benefits, as described above, are derived.

In general, various configurations of the injection and compression steps are possible. It is possible, for example, to time the injection of the flooding material in dependence on the pressure below atmospheric in the cavity. The pressure below atmospheric is hereby measured and transmitted to a control unit. The compression step may be controlled or regulated in dependence on the injection time. It is also possible to use a separate nozzle to inject into the cavity a gas mixture for providing surface activation of the carrier component after the mold is closed and before the vacuum is applied. Such activation is necessary when certain combinations of thermoplastic and polyurethane materials are involved in order to ensure a bond. This procedure has the benefit that the vacuum can be used to suck out this gas or gas mixture. The used gas may also be recovered for a next cycle.

It is also possible to slightly open the mold during the compression step before the mold is contracted to its final size. This step is desired, when a particular disposition of the "mold cake" of the flooding material appears necessary and this material should be prevented from sliding off.

As an alternative, it is also possible to close the clamping unit in dependence on the injection pressure during the flooding process and/or to build up the clamping force in accordance with a predefined pressure profile. For this purpose, the pressure in the supply line for the flooding material is ascertained and transmitted to a control unit. When using polyurethane material as flooding material, the pressure can be measured, for example, in a polyol line and/or an isocyanate line and/or a feed line for paint or material.

According to another feature of the present invention, the mold may be closed during the injection process in a path-dependent and force-dependent manner, or to build up the clamping force accordingly. As a result, the need for separate sensors is eliminated.

According to another aspect of the present invention, an apparatus for making a composite includes a clamping unit having a mold which defines at least one cavity for introduction of a carrier component, an injection unit for injecting a flooding material into the cavity, when the mold is closed at least in part, a vacuum unit to produce a pressure below atmospheric in the cavity, when the mold is closed at least in part and before a compression molding step is executed, a sensor for measuring the pressure below atmospheric in the cavity, and a control unit operatively connected to the sensor and the vacuum unit.

The carrier component may be produced beforehand by a separate process and temporarily stored. After storage, the carrier component can then be transferred to the clamping unit for subsequent implementation of the flooding process. In other words, this procedure would require two devices, namely a device for making the carrier component and a device for the flooding process. In addition, there would be a need for a storage facility.

Thus, the use of a reversing plate, rotary table, or sliding table seems a more beneficial approach. During a same cycle, a carrier component may be injection-molded while an injection-molded carrier component may simultaneously be flooded. In this procedure, the injection step or the injection compression step for the carrier component of thermoplastic material can, however, normally be carried out only when the clamping force has been fully established, i.e. after the actual compression step. In other words, the carrier component is first placed into the enlarged cavity which is closed to the compression position and the compression step is executed after evacuation of the enlarged cavity to effect a production in a same cycle. After undergoing the compression step, the clamping force has been fully established. The injection molding step for producing the thermoplastic carrier can then be carried out in a further cavity, using reversing plate, rotary table, or sliding table techniques. In this way, it is possible to produce in each cycle a carrier component and a finished composite.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
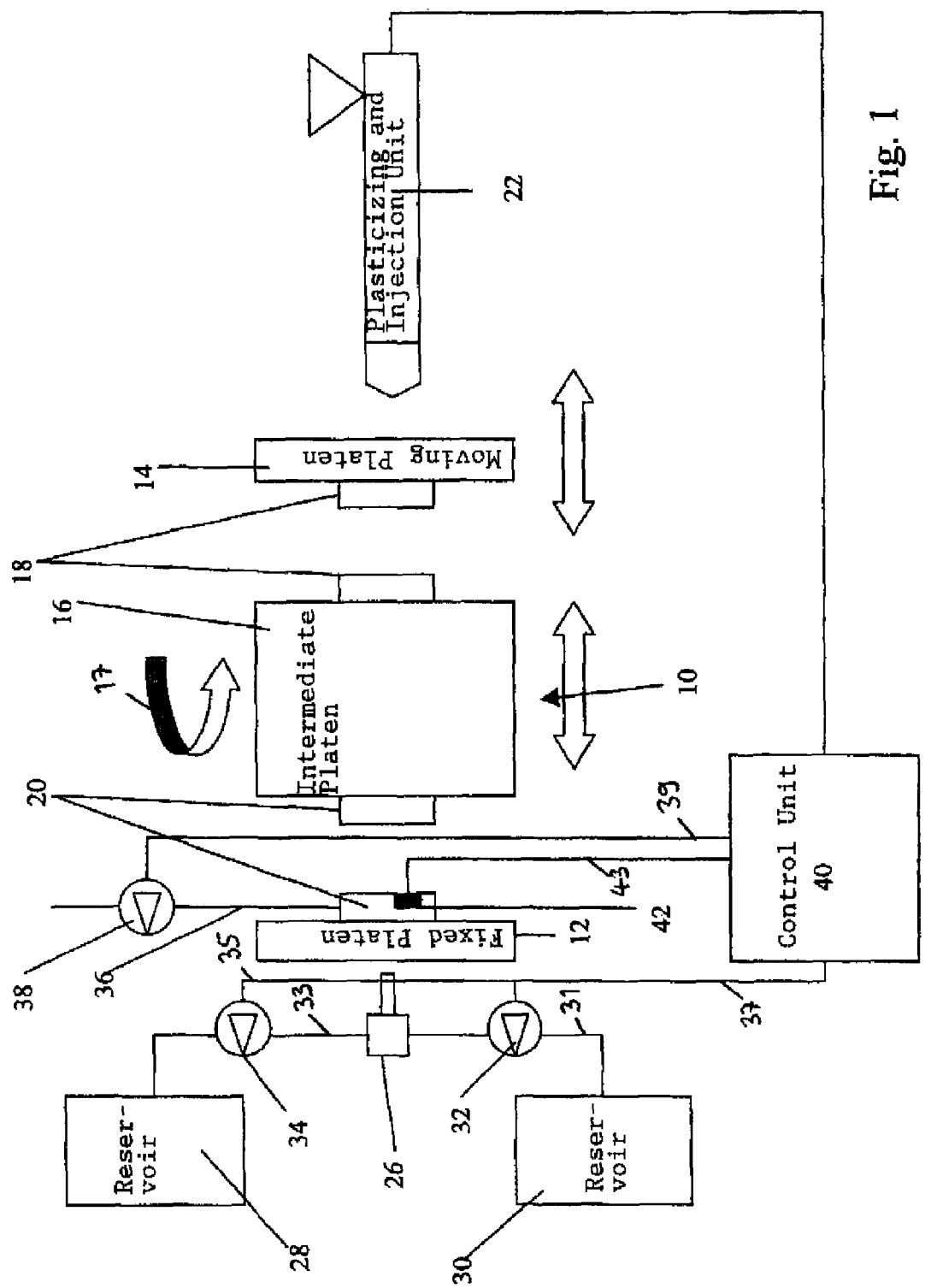
FIG. 1 shows a schematic block diagram of an apparatus for making a composite in accordance with the present invention, using reversing plate technology.

The depicted embodiment is to be understood as illustrative of the invention and not as limiting in any way. It should also be understood that the figure is not necessarily to scale and that the embodiment is sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a schematic block diagram of an apparatus for making a composite in accordance with the present invention. It will be appreciated by persons skilled in the art that the apparatus must contain much mechanical elements which do not appear in FIG. 1, e.g. force transmitting elements (tie bars), mechanism to create the clamping force, machine bed, rotary drive. However, these elements, like much other necessary elements for a clamping unit or plasticizing and injection unit or polyurethane unit, are not part of the invention, and have been omitted from FIG. 1 for the sake of simplicity and for reasons that their structure is generally known to the artisan.

The apparatus includes a clamping unit,. generally designated by reference numeral 10 and including a fixed platen 12, a moving platen 14, and an intermediate platen 16 which is disposed between the fixed and moving platens 10, 12 and able to rotate about a vertical axis as well as move in an axial direction. The fixed platen 12 and the intermediate platen 16 have platen areas to carry half-molds which together define a mold 20, whereas the moving platen 14 and the intermediate platen 16 have platen areas to carry half-molds which together define a mold 18. The half-molds of the intermediate platen 16 are hereby identical.

FIG. 1 shows to the right of the clamping unit 10 the presence of a plasticizing and injection unit 22 which melts incoming plastic pellets to form a melt which can be pressed into the cavity of the mold 18, when the mold is closed. The plasticizing and injection unit 22 is operatively connected to a control unit 40. The shown connection is intended to generally indicate the control communication of the plasticizing and injection unit 22 with the control unit 40 and may include, of course, any number of connecting lines. For example, an actual construction may include numerous control lines between the control unit 40 and the plasticizing and injection unit 22. Not shown in detail are various drives that are provided in the area of the plasticizing and injection unit 22.

FIG. 1 shows to the left of the clamping unit 10 a polyurethane unit having a mixing head 26 and two reservoirs 28, 30 for a polyol component and an isocyanate component, respectively. The reservoirs 28, 30 are respectively connected to the mixing head 26 via conduits 31, 33, with pumps 32, 34 disposed in the conduits 31, 33, respectively. Necessary drives are also not shown here. The pumps 32, 34 are operatively connected to the control unit 40 via control lines 35, 37.

A vacuum line 36 is connected to a left part of the mold 20 and extends into the area of the cavity to draw air from the cavity, when closed, with the assistance of a vacuum pump 38 which is also operatively connected to the control unit 40 via line 39.

As further shown in FIG. 1, a pressure sensor 42 is placed in the half-mold of the fixed platen 12 for ascertaining a pressure below atmospheric. The pressure sensor 42 is arranged at a location to allow measurement of the pressure in the cavity, when the mold 20 is closed, and is operatively connected to the control unit 40 via line 43.

The mode of operation of the apparatus is as follows:

Starting point is a completely emptied clamping unit 10, i.e. both molds 18, 20 are empty and clean. This state is shown in FIG. 1. Starting the apparatus causes the clamping unit 10 to close, with both molds 18, 20 closing as well, i.e., both moving platen 14 and intermediate platen 16 are moved to the left in FIG. 1. When being fully closed and after applying the full clamping force, mold 18 receives plastic melt from the plasticizing and injection unit 22, which has been moved in the direction of the moving platen 14, to execute a normal injection molding process. A carrier component is produced after the material has cured. The clamping unit 10 is then opened again and subsequently the intermediate platen 16 is rotated by 180° in a direction of arrow 17 so that the half-molds of the molds 18 and 20 are swapped. The thermoplastic carrier component remains in the half-mold of the mold 18 on the intermediate platen 16 and thus pivots also by 180°. After rotation, mold 18 is empty again because two empty half-molds oppose one another.

The previously produced injection-molded part (carrier component) is accommodated in the half-mold of mold 20 on the intermediate platen 16, with the mold 20 being open. Clamping unit 10 is now closed again, whereby the mold 20 moves to a position which establishes a cavity that has an expanded size in comparison to a final cavity size. The cavity is hereby still substantially sealed off in this position against the ambient environment so that only little ambient air is normally able to enter the mold 20. Operation of the vacuum pump 38 removes air from the space between the thermoplastic component, received in the expanded cavity, and the cavity wall. When the pressure sensor 42 determines that a certain pressure below atmospheric has been reached in the cavity, polyurethane material is injected into the mold 20 by the mixing head 26 which has been moved into close proximity of the mold 20. The vacuum pump 38 is turned off at the same time. As the injection process commences, the mold 20 is fully closed by applying the clamping force to carry out the compression step and thus to compress the introduced material. As an alternative, execution of the compression step may also be delayed until the polyurethane material has substantially or entirely been introduced into the cavity.

The compression process is over after complete introduction and compression of the polyurethane material as well as establishment of the final clamping position. The clamping force is fully applied and the mold 18 is also held together by the full clamping force.

In this state, the thermoplastic material may also be injected into the cavity of the mold 18. Once the thermoplastic material and the polyurethane material have cured in the cavities of the molds 18 and 20, respectively, the clamping unit 10 is opened again. In a next step, the finished component is removed from the mold 20. The intermediate platen 16 is then rotated again by 180° and a new cycle can start again, as described above.

Of course, the apparatus may equally be equipped with a rotary table or sliding table instead of a reversing plate technique. Also other compression or injection steps may be carried out. In addition, the control unit may be based on various pressure or time controls. A pressure control involves the use of a respective sensor to determine the pressure. Moreover, it is also conceivable to use various devices in order to activate the surface of the thermoplastic component. This may be realized in a manner generally known to the artisan through flame treatment, plasma application, or gas application. When gas treatment is involved, a not shown nozzle is hereby used to introduce gas into the expanded cavity formed by the closed mold 20, with the gas being sucked off by means of the vacuum pump before flooding the cavity with the polyurethane material.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of making a composite, comprising the steps in the order of:
   producing a carrier component;
   transferring the carrier component into an open cavity of a mold;
   closing the mold to a predefined position in which the cavity has a first expanded size;
   applying a predefined pressure below atmospheric in the cavity of first expanded size to produce a vacuum;
   measuring the pressure in the cavity of first expanded size;
   introducing flooding material into the cavity of first expanded size; and
   executing a compression molding step by reducing the cavity to a second contracted size.

2. The method of claim 1, wherein the compression-molding step is executed at a same time as flooding material is introduced into the cavity of first expanded size.

3. The method of claim 1, wherein the compression-molding step is executed after the introducing step.

4. The method of claim 1, wherein the carrier component is produced by an injection molding process or injection compression molding process.

5. The method of claim 1, wherein the flooding material is a polyurethane material.

6. The method of claim 1, wherein the applying step includes the step of generating the vacuum for a predefined time.

7. The method of claim 1, wherein the compression molding step is executed while the flooding material is introduced and during a time period after the flooding material has been introduced.

8. The method of claim 1, wherein the introducing step includes the step of injecting the flooding material at a time instance in dependence on a magnitude of the pressure below atmospheric.

9. The method of claim 1, wherein the compression molding step is controlled in dependence on a time of introduction of the flooding material.

10. The method of claim 1, further comprising the step of introducing a medium for activating a surface of the carrier component into the cavity of first expanded size before the applying step.

11. The method of claim 1, further comprising the step of opening the mold in a predetermined manner before the compression molding step.

12. The method of claim 1, wherein the introducing step includes the step of injecting the flooding material, wherein the compression molding step is executed in dependence on a pressure by which the flooding material is injected into the cavity of first expanded size.

13. The method of claim 1, wherein the compression molding step is executed path-dependent and force-dependent.

* * * * *